(12) United States Patent
Petri et al.

(10) Patent No.: US 6,505,521 B1
(45) Date of Patent: Jan. 14, 2003

(54) FOIL PRESSURE SENSOR WHICH CAN BE TESTED

(75) Inventors: Volker Petri, Aidlingen (DE); Reinhold Mickeler, Altdorf (DE); Michael Meyer, Sindelfingen (DE); Bogdan Serban, Soleuvre (LU); Michel Witte, Bertrange (LU)

(73) Assignees: DaimlerChrysler AG, Stuttgart (DE); I.E.E. - International Electronics S.a.r.L. (LU)

( * ) Notice: Subject to any disclaimer, the term of this patent is extended or adjusted under 35 U.S.C. 154(b) by 942 days.

(21) Appl. No.: 08/924,941

(22) Filed: Sep. 8, 1997

Related U.S. Application Data

(63) Continuation of application No. 08/698,928, filed on Aug. 16, 1996, now abandoned.

(30) Foreign Application Priority Data

Aug. 16, 1995 (DE) .......................... 195 30 092

(51) Int. Cl.$^7$ ................................. G01D 7/00
(52) U.S. Cl. ................................. 73/862.042
(58) Field of Search .............. 73/700, 715, 754, 73/862.042; 200/85 A

(56) References Cited

U.S. PATENT DOCUMENTS

| | | | |
|---|---|---|---|
| 3,749,866 A | * 7/1973 | Tiakzun et al. | ............ 200/85 A |
| 4,661,664 A | * 4/1987 | Miller | ...................... 200/85 A |
| 5,010,774 A | 4/1991 | Kikuo et al. | |
| 5,357,108 A | 10/1994 | Suzuki et al. | |

FOREIGN PATENT DOCUMENTS

| | | | |
|---|---|---|---|
| DE | 29 11 133 A1 | 9/1979 | |
| DE | 4237 072 C1 | 12/1993 | |
| GB | 2 222 258 A | 2/1990 | |
| JP | 59-005669 | 1/1984 | |
| JP | 01-289178 | 11/1989 | |
| JP | 02-051245 | 2/1990 | |
| JP | 2-304826 | * 12/1990 | ............... 200/85 A |
| JP | 06-045423 | 2/1994 | |

* cited by examiner

*Primary Examiner*—Harshad Patel
(74) *Attorney, Agent, or Firm*—Crowell & Moring LLP

(57) ABSTRACT

The invention provides a testable foil pressure sensor constructed of two carrier foils which are laminated together. The first carrier foil is coated with a semiconductor material, while the second carrier foil has two adjacent strip conductors which can each be bonded on both ends and which, within spatially bounded areas which form sensor elements, have "comb" structures, with individual fingers which mesh with one another in a no-contact manner. According to the invention, within a sensor element, at least one of the contact fingers of the comb structure is formed by a strip conductor loop and at least one other contact finger is formed by a stub line branching off a strip conductor.

6 Claims, 3 Drawing Sheets

Prior Art

FOIL PRESSURE SENSOR WHICH CAN BE TESTED

This is a continuation of application Ser. No. 08/698,928, filed Aug. 16, 1996 now abandoned.

BACKGROUND AND SUMMARY OF THE INVENTION

This invention relates to a foil pressure sensor of the type which can be tested, and has two laminated foil carrier layers, one of which is coated with a semiconductor polymer and the other has strip conductors arranged in a comb pattern.

Such a foil pressure sensor is disclosed in German patent document DE 42 37 072 C1, and is illustrated in FIG. 3a, as a strip conductor diagram. The foil pressure sensor is constructed of two carrier foils that are made of a thermoplastic material and laminated together. The first is coated with a semiconductor polymer, and the second is coated with two adjacent strip conductors which can each be bonded on both ends. Within spatially bounded areas which form sensor elements, the strip conductors have comb structures which mesh with each other, but do not contact each other. When the sensor element is loaded by a normal force, the semiconductor material switches adjacently arranged, more or less parallel, contact fingers of the comb structures, as a function of the force. Electric resistance between the two strip conductors therefore decreases as the pressure force increases.

This foil pressure sensor is conceived for safety-relevant applications in a motor vehicle, particularly for detecting seat occupancy. Each interruption of a strip conductor as the result of mechanical damage or a short circuit between the strip conductors can be detected by means of a simple continuity check, which measures the electric resistance of the strip conductors. The continuity check can, for example, take place in the course of an automatic testing sequence at every start of the vehicle or at predetermined time intervals. By means of the special construction of the contact fingers, which form the comb structure, as strip conductor loops, the contact fingers are fully included in the testing.

The foil pressure sensor of the above-mentioned type, illustrated in FIG. 3a herein, represents a further refinement of the simple foil pressure sensor illustrated in FIG. 3b, which may be derived, for example, from German patent document DE 30 44 384 A1. In this case, the comb structure is implemented by stub lines branching vertically off a main branch.

If a large number of sensor elements are connected in series, a large overall length, and therefore large strip conductor resistances, results in the case of the foil pressure sensor known from the above German patent documents, due to the meandering branch-off-free construction of the strip conductors. From the standpoint of resistance to interference and electromagnetic compatibility (EMV), however, it is desirable to construct the overall system of all pressure-sensitive elements to have a low impedance. For this reason, the semiconductor polymer layer is dimensioned to be of low impedance. However, in this case, because of overlapping resistance ranges, the result of a line continuity check in which the sum of the two specific resistances is measured, cannot be distinguished from the case in which several pressure sensors are acted upon by a maximal pressure. Operational testing in the loaded condition is therefore not possible.

This can be remedied by wider construction of the strip conductors and by reducing the number of contact fingers per sensor element. This would have the result, however, that, on the one hand, the sensor elements become larger and, on the other hand, they become less sensitive. In diverse applications in which, for example, mechanical prestresses and torsional influences could result in incorrect measurements, an enlargement of the sensor surfaces is not desirable. Furthermore, when the foil pressure sensor is used for seat occupancy recognition, a plurality of large-surface sensor elements would impair the air permeability of the seat.

It is an object of the invention to provide a foil pressure sensor which has a low impedance, has a sensitivity which is as high as possible for a particular surface, and that the same time is easily checked.

This object is achieved by the foil pressure sensor according to the invention which differs from the foil pressure sensor of the type described above in that, in addition to the contact fingers constructed as strip conductor loops, the sensor element also has contact fingers which are constructed as stub lines—that is, individual conductors which have a narrower width than the main strip conductors, branch separately therefrom, and are not part of the conductive path formed by the conductor loops. The stub lines require less space than the strip conductor loops so that, while the surface is the same, the sensitivity is increased if one or several strip conductor loops are replaced by stub lines. At the same time, by leaving out strip conductor loops, the strip conductor resistance is reduced so that the desired low-impedance design of the strip conductor structure is achieved.

The sensor element according to the invention also has a facility to be tested which is sufficient in practice. That is, an interruption of an individual contact finger caused by a thin crack, as a rule, does not significantly impair the sensor element because, in the case of a pressure load, a thin crack is in most cases electrically bridged by the semiconductor material. Thus, thin, individually occurring cracks can be tolerated. Therefore, contrary to the prior art described above, it is no longer necessary that each individual contact finger be testable.

A rough ability of the sensor element to be tested is still required and, according to the invention, is ensured by a few contact fingers constructed as strip conductor loops In a continuity check, such an arrangement will recognize any larger crack of the dimension of the sensor element and of a thickness which is not bridged in the case of a pressure load.

Other objects, advantages and novel features of the present invention will become apparent from the following detailed description of the invention when considered in conjunction with the accompanying drawings.

DETAILED DESCRIPTION OF THE DRAWINGS

Figure 1:
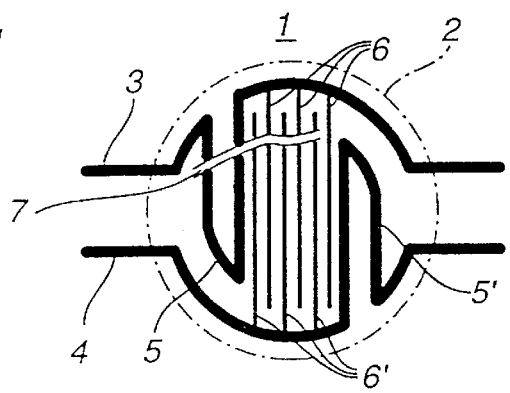
FIG. 1 is a view of a first embodiment of a foil pressure sensor according to the invention.

The foil pressure sensor according to the invention, as shown in FIG. 1, consists of a single circular sensor element 1. Within the pressure-sensitive area, which is bounded by the dot dash line 2, each of the two strip conductors 3, 4 changes into a comb-type structure constructed of several contact fingers. The comb-type structures are arranged mutually opposite and facing one another and are interleaved with one another in a no-contact manner. The contact fingers are formed by strip conductor loops 5, 5', on the one hand, and by stub lines 6, 6' which branch perpendicularly off the strip conductors 3, 4, on the other hand. The strip conductors 3, 4 have a comparatively thick construction in order to keep the whole specific resistance as low as possible and to facilitate continuity testing. In contrast, the stub lines 6, 6' may have a comparatively thin construction because they do not participate in the continuity test. A thin construction has the additional advantage that the sensitivity of the sensor element can be increased by arranging the stub lines 6, 6' on the same surface, as also illustrated in FIG. 1.

FIG. 1 also shows the course of a typical crack 7 which extends across several contact fingers. Since a contact finger formed by the strip conductor loop 5 itself is included, the crack 7 will be recognized during a continuity test. (Such a crack would not be recognized in the case of a sensor element according to the prior art, such as FIG. 3b, in which the comb-type structures are formed only be stub lines.) The arrangement and distribution of the strip conductor loops 5, 5' within the sensor element 1 determines the size and course of the cracks which are recognized during a continuity test. A sufficiently large crack can be reliably recognized not only in the unloaded condition but also when subjected to a load. In contrast, a thin crack would be bridged by semiconductor material in the case of a pressure load (FIG. 4b), and would therefore be reliably recognizable only in the unloaded condition. From continuity checks with sensors which are loaded, on the one hand, and unloaded, on the other hand, conclusions can therefore be drawn with respect to the thickness of the crack. When the sensor element according to the invention is used in a sensor mat for recognizing occupancy of the front passenger seat, a thin crack in the sensor element would be recognized first when the seat is unoccupied and would be reported. However, actual impairment of the occupancy recognition function will occur later because, as a result of the above-mentioned bridging effect, the sensor element will at first still be operable under a load. (It will become completely inoperable only when, even when the seat is occupied, the continuity measurement detects an interruption in a sensor element.) The driver of the vehicle will therefore receive timely warning of the imminent inoperability of the seat occupancy recognition function.

As illustrated in FIG. 1, in an advantageous embodiment the exterior contact fingers are formed by the strip conductor loops themselves and the interior area thus bounded is filled up with contact fingers constructed as stub lines. By means of this arrangement, cracks which have their origin outside the sensor element and expand with time are recognized early upon reaching the sensor element.

Figure 2A:
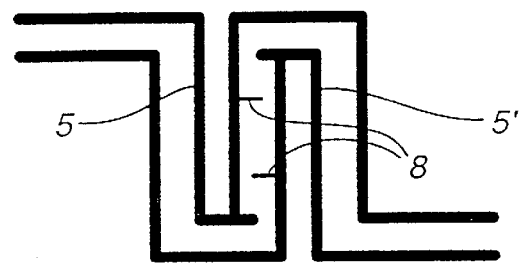
FIGS. 2a–2c are views of additional embodiments.
Figure 2B:
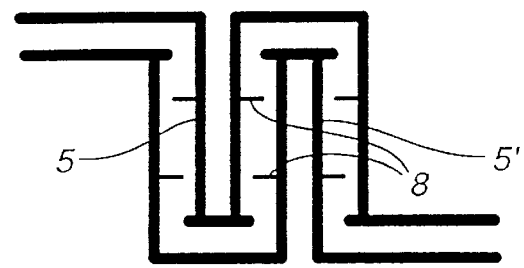

In the sensor elements illustrated in FIGS. 2a and 2b, respective adjoining contact fingers of different strip conductors which are formed by strip conductor loops 5, 5' set up an active space into which stub lines 8 project which branch off the strip conductor loops 5, 5' forming contact fingers. As a result, the effective surface of the contact fingers and therefore the sensitivity of the sensor element will increase. For this purpose, geometrical shapes other than the stub lines 8 may be provided, such as small triangles or hemispheres which increase the surface of the strip conductor loop into the active space.

Figure 2C:
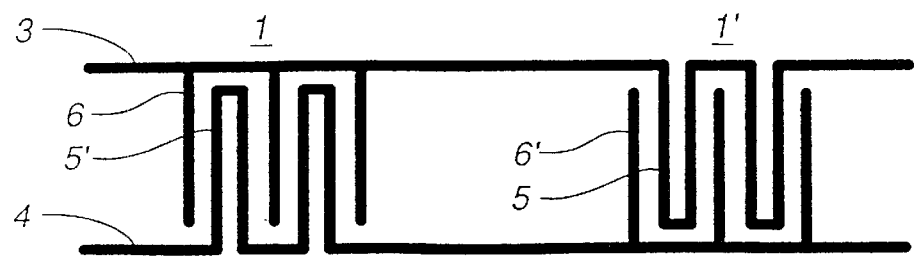

FIG. 2c illustrates two sensor elements 1, 1' which are connected in series. In the individual sensor element 11 one strip conductor 3 has a first comb structure formed exclusively by stub lines 6, while the other strip conductor 4 has a second comb structure formed exclusively of strip conductor loops 5'. As the result, a contact finger constructed as a strip conductor loop 5' is always arranged next to a contact finger constructed as a stub line 6.

The second sensor element 1' has the reverse arrangement from that of the first sensor element 1 in that the first or the second comb structure is now formed by the respective other strip conductor. Thus, in the sensor element 1', the one strip conductor 3 whose comb structure previously had two stub lines 6 now has strip conductor loops 5 while the comb structure of the other strip conductor 4 has stub lines 6'. As the result of this alternating of the comb structures, the continuity resistance is uniformly distributed to the two strip conductors 3, 4 which may be an advantage during the evaluation of the continuity test.

Figure 3A:
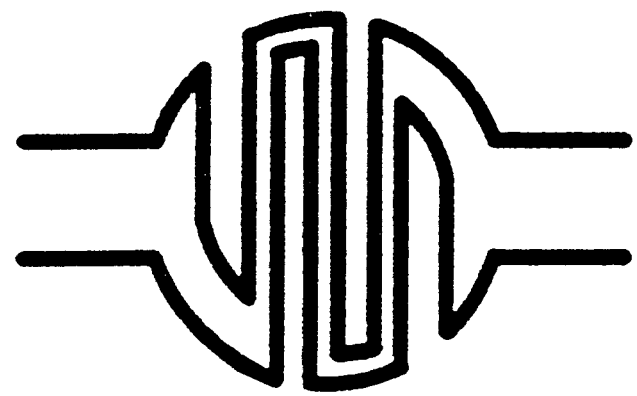
FIGS. 3a and 3b show the strip conductor structure of prior art foil pressure sensors.
Figure 3B:
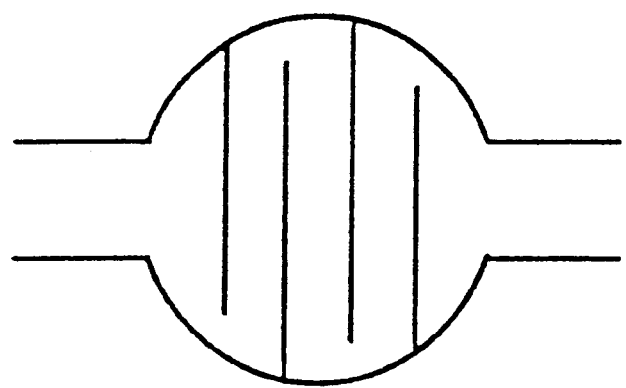

FIG. 3a illustrates a sensor element known from German patent document DE 42 37 072 C1, which permits complete testing of the comb structure. FIG. 3b shows a sensor element as it is also known from the prior art (German Patent Document DE 30 44 384 A1). In the latter case, the contact fingers, constructed only as stub lines, are not detected by a continuity test.

Figure 4A:
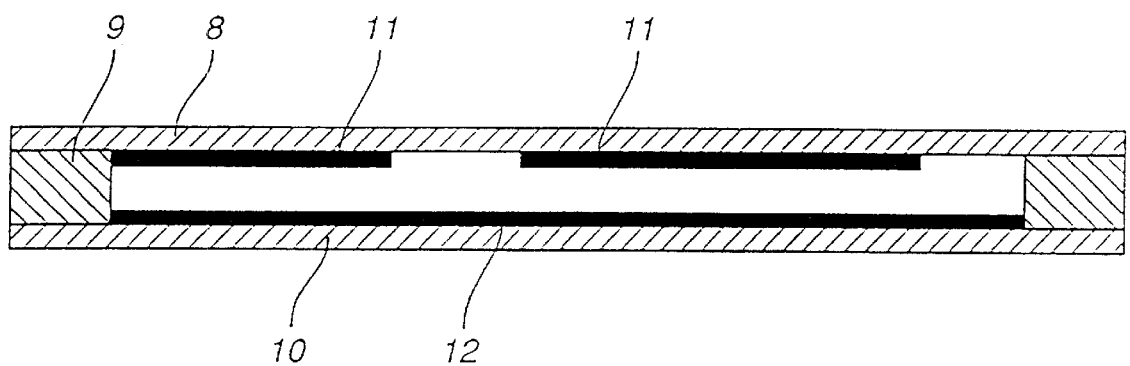
FIGS. 4a and 4b are cross-sectional views of a foil pressure sensor without, and with, a pressure load.
Figure 4B:
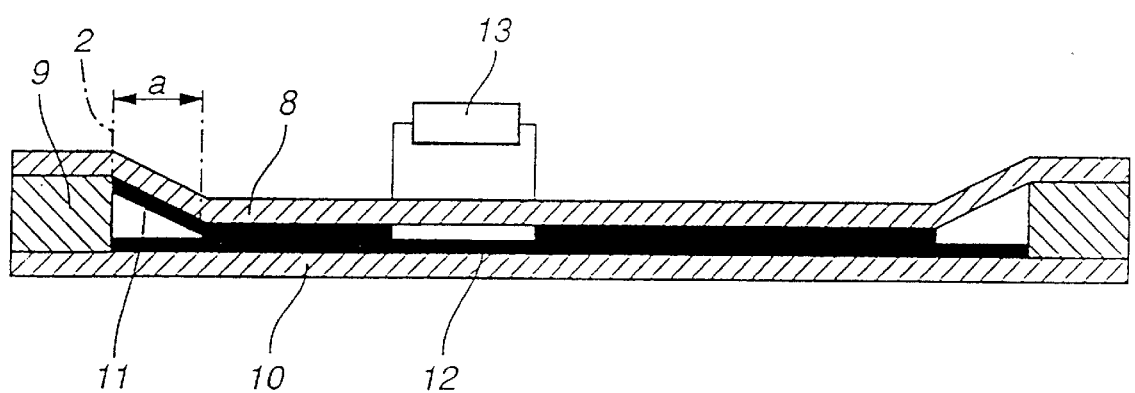

Finally, in FIGS. 4a and 4b, the above-mentioned bridging effect is illustrated. The two figures are cross-sectional views of a foil pressure sensor in which a stub line 11 is interrupted (by a crack, for example). FIG. 4a shows the sensor element in an unloaded condition. In contrast, in FIG. 4b, the bent upper carrier foil 8 is loaded in a clearly visible manner. The upper carrier foil 8 and the lower carrier foil 10 are laminated together by means of a foil 9 which is adhesive on both sides. In the pressure-sensitive area which is bounded by the dash dot line 2 (see also, FIG. 1) the center adhesive foil is omitted, and is therefore used as a spacer 9 which, in the unloaded condition, separates the strip conductors and the stub line 11 from the semiconductor polymer layer 12 situated underneath.

The sensor element in FIG. 4b is acted upon by force. As can be seen, an interruption in a line extending within the pressure-sensitive area, such as the stub line, is bridged by the semiconductor polymer layer 12 with its specific resistance as a function of the force. This bridging is represented symbolically by the resistance 13. As a result, the uninterrupted line remains largely operable because, in the loaded condition, an absent line segment is replaced by the resistance. The sensor element is the less impaired the shorter the interruption in the line.

However, it is a limiting factor that the illustrated bridging effect does not occur in the area designated by the letter a, in proximity to the spacer 9 (and therefore to the contour 2) as illustrated in FIG. 4b. Because of the finite deflection radius, no bonding of the interrupted line can take place with the semiconductor polymer layer within the marginal area a. Thus, in the case of such an interruption, there will be a total breakdown of the concerned stub line and a pronounced disturbance of the sensor element.

In order to alleviate this difficulty, the relief of the intermediate adhesive foil is designed in such a manner that the contour 2 of the relief surrounds the comb structures at such a distance that, in the case of a pressure load, the strip conductor sections of the contact fingers come into a complete contact with the semiconductor polymer 12. However, this is not always possible. Particularly in the case of comparatively large-surface sensor elements, the relief in the adhesive foil which forms the contour 2 must be as small as possible in order to avoid a sagging of the upper carrier foil 8. For these cases, the use of a foil pressure sensor according to the invention is recommended, in the case of which, by means of the contact fingers constructed as strip conductor loops, an interruption in the marginal area a can be detected in a continuity measurement.

Thus far, the bridging effect has been mentioned only in connection with a line interruption. However, it will also occur when the semiconductor polymer layer is point-defective while the strip conductor is intact.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Foil pressure sensor of the type having at least two carrier foils made of a thermoplastic material which are laminated together, a first carrier foil being coated with a semiconductor polymer and a second carrier foil being coated with adjacent strip conductors, each of which, within areas which are spatially bounded and form sensor elements, has a comb structure with fingers which are arranged in proximity to, but do not contact, fingers of at least another of said strip conductors, wherein, within a sensor element:

at least one said fingers of said comb structures is formed by a strip conductor loop; and at least one other contact finger is formed by a stub line branching off a strip conductor.

2. Foil pressure sensor according to claim 1, wherein contact fingers situated on a periphery of a sensor element 1 are formed by strip conductor loops.

3. Foil pressure sensor according to claim 1, wherein stub lines 8 branch off from a strip conductor loop.

4. Foil pressure sensor according to claim 1, wherein a contact finger of one strip conductor, which contact finger is constructed as a strip conductor loop is arranged next to a contact finger of another strip conductor which is constructed as a stub line.

5. Foil pressure sensor which can be tested, according to claim 4, wherein the carrier foils are laminated together by means of an intermediate adhesive foil which is omitted in the areas which form the sensor elements, the contour of a relief surrounding the comb structures being at such a distance that, in the case of a pressure load, strip conductor sections of the contact fingers come into a complete contact with the semiconductor polymer.

6. Seat occupancy detection device comprising foil pressure sensor of the type having at least two carrier foils made of a thermoplastic material which are laminated together, a first carrier foil being coated with a semiconductor polymer and a second carrier foil being coated with adjacent strip conductors, each of which, within areas which are spatially bounded and form sensor elements, has a comb structure with fingers which are arranged in proximity to, but do not contact, fingers of at least another of said strip conductors, wherein, within a sensor element:

at least one said fingers of said comb structures is formed by a strip conductor loop; and at least one other contact finger is formed by a stub line branching off a strip conductor.

\* \* \* \* \*